United States Patent
Seehafer et al.

(10) Patent No.: US 10,349,616 B2
(45) Date of Patent: Jul. 16, 2019

(54) ROTARY QUICKSTART

(71) Applicant: Technologies Holdings Corp., Houston, TX (US)

(72) Inventors: John Seehafer, Marshfield, WI (US); Todd Willfahrt, Auburndale, WI (US)

(73) Assignee: Technologies Holdings Corp., Houston, TX (US)

( * ) Notice: Subject to any disclaimer, the term of this patent is extended or adjusted under 35 U.S.C. 154(b) by 189 days.

(21) Appl. No.: 15/675,186

(22) Filed: Aug. 11, 2017

(65) Prior Publication Data

US 2019/0045737 A1     Feb. 14, 2019

(51) Int. Cl.
| | |
|---|---|
| *A01J 5/00* | (2006.01) |
| *A01J 5/017* | (2006.01) |
| *A01J 5/04* | (2006.01) |
| *A01J 5/16* | (2006.01) |
| *A01J 5/007* | (2006.01) |

(52) U.S. Cl.
CPC ............... *A01J 5/017* (2013.01); *A01J 5/007* (2013.01); *A01J 5/042* (2013.01); *A01J 5/16* (2013.01)

(58) Field of Classification Search
CPC .................................. A01J 5/007; A01K 5/017
USPC ........... 119/14.01–14.03, 14.05, 14.08, 14.1, 119/14.13, 14.46–14.48, 14.5, 14.54
See application file for complete search history.

(56) References Cited

U.S. PATENT DOCUMENTS

| | | | | | |
|---|---|---|---|---|---|
| 3,929,103 | A | * | 12/1975 | Schluckbier | A01J 5/017 119/14.08 |
| 3,973,520 | A | * | 8/1976 | Flocchini | A01J 5/017 119/14.08 |
| 4,408,564 | A | * | 10/1983 | Flocchini | A01J 5/017 119/14.08 |
| 4,586,462 | A | * | 5/1986 | Icking | A01J 5/017 119/14.1 |
| 5,379,722 | A | * | 1/1995 | Larson | A01J 3/00 119/14.1 |
| 5,809,931 | A | * | 9/1998 | Ellis | A01J 5/00 119/14.08 |
| 5,960,737 | A | * | 10/1999 | Larson | A01J 5/017 119/14.08 |
| 6,240,878 | B1 | * | 6/2001 | Larson | A01J 5/017 119/14.08 |
| 7,984,693 | B2 | * | 7/2011 | Mader | A01J 5/017 119/14.08 |
| 8,166,915 | B2 | * | 5/2012 | Lingard | A01J 5/017 119/14.08 |
| 8,561,576 | B2 | * | 10/2013 | Pingsterhaus | A01K 1/0613 119/732 |

(Continued)

*Primary Examiner* — Richard T Price, Jr.
(74) *Attorney, Agent, or Firm* — Baker Botts L.L.P.

(57) ABSTRACT

A milking system includes an assembly, a controller, and a milking cluster configured to attach to one or more teats of a livestock. The assembly includes a clevis, a piston, a pulley system, and a sensor. The clevis includes a first member, a second member, a base member, and a cylinder. The cylinder is coupled to the base member. The piston is positioned at least partially within the cylinder, and is configured to move within the cylinder. The pulley system of the assembly includes a cord configured to be coupled to the milking cluster. The assembly includes a sensor configured to generate a displacement signal in response to detecting that a portion of the clevis is within a predefined distance of the sensor.

14 Claims, 5 Drawing Sheets

(56) References Cited

U.S. PATENT DOCUMENTS 8,944,005 B2 * 2/2015 Hansen .................. A01J 5/017
119/14.08

* cited by examiner

US 10,349,616 B2

1

ROTARY QUICKSTART

TECHNICAL FIELD OF THE INVENTION

This disclosure generally relates generally to dairy farming and more particularly to a rotary quickstart system for attaching a milking cluster to a livestock.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY

According to embodiments of the present disclosure, disadvantages and problems associated with previous systems may be reduced or eliminated.

In some embodiments, a milking system includes a milking cluster, an assembly, and a controller. The milking cluster is configured to attach to one or more teats of a livestock. The assembly includes a clevis, a piston, a pulley system, and a sensor. The clevis includes a first member, a second member, a base member, and a cylinder. The first member of the clevis includes a first aperture configured to couple a pulley system to the clevis. The second member of the clevis includes a second aperture configured to couple the pulley system to the clevis. The base member of the clevis may be coupled to the first member and the second member. The cylinder of the clevis may be coupled to the base member. The piston of the assembly may be positioned at least partially within the cylinder, and is configured to move within the cylinder. The pulley system of the assembly includes a cord. The cord includes a first end coupled to the milking cluster. The sensor is configured to generate a displacement signal in response to detecting that a portion of the clevis is within a predefined distance of the sensor. The controller is configured to receive the displacement signal from the sensor.

In some embodiments, an assembly includes a clevis, a piston, a pulley system, and a sensor. The clevis includes a first member, a second member, a base member, and a cylinder. The first member of the clevis includes a first aperture configured to couple a pulley system to the clevis. The second member of the clevis includes a second aperture configured to couple the pulley system to the clevis. The base member of the clevis may be coupled to the first member and the second member. The cylinder of the clevis may be coupled to the base member. The piston of the assembly is positioned at least partially within the cylinder, and is configured to move within the cylinder. The pulley system of the assembly includes a cord. The cord includes a first end coupled to the milking cluster. The sensor is configured to generate a displacement signal in response to detecting that a portion of the clevis is within a predefined distance of the sensor.

In some embodiments, a clevis of a milking system comprises a first member, a second member, a base member, and a cylinder. The first member comprises a first aperture configured to couple a pulley system to the clevis. The second member comprises a second aperture configured to couple the pulley system to the clevis. The base member is

2 coupled to the first member and the second member. The cylinder is coupled to the base member.

Certain embodiments of the present disclosure may provide one or more technical advantages. For example, certain embodiments determine that a milking cluster has been lifted. Upon a determination that the milking cluster has been lifted, certain embodiments activate the assembly to release the milking cluster so that the milking cluster may be attached to the livestock to be milked.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
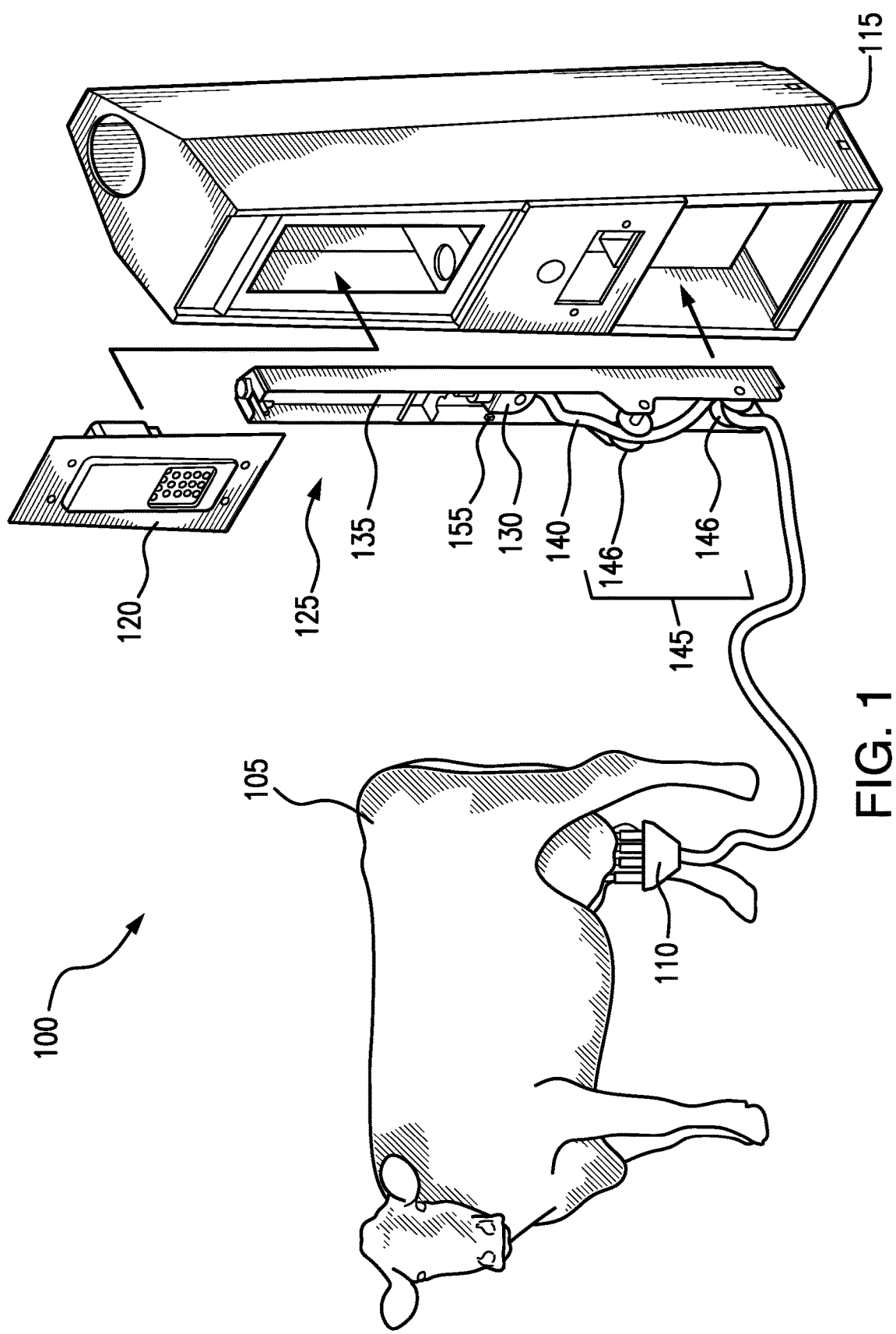
FIG. 1 illustrates a milking system, according to certain embodiments.
Figure 2A:
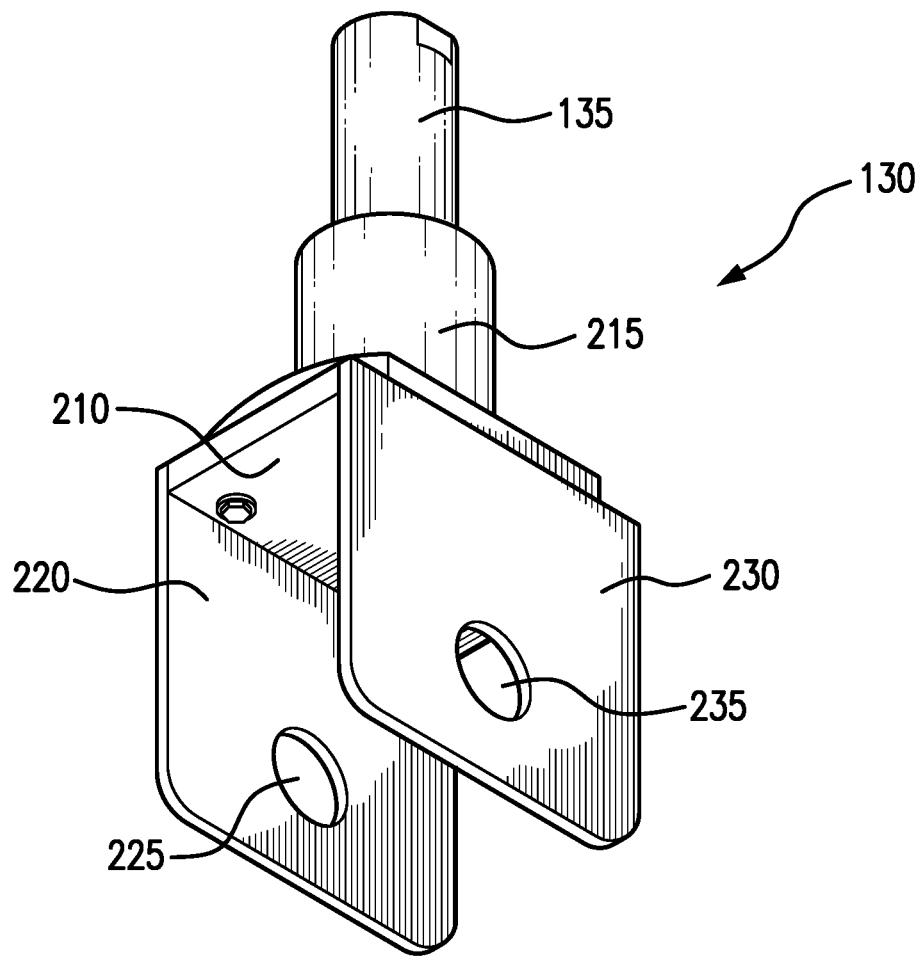
FIG. 2A illustrates a perspective view of a clevis of the milking system of FIG. 1, according to certain embodiments.
Figure 2B:
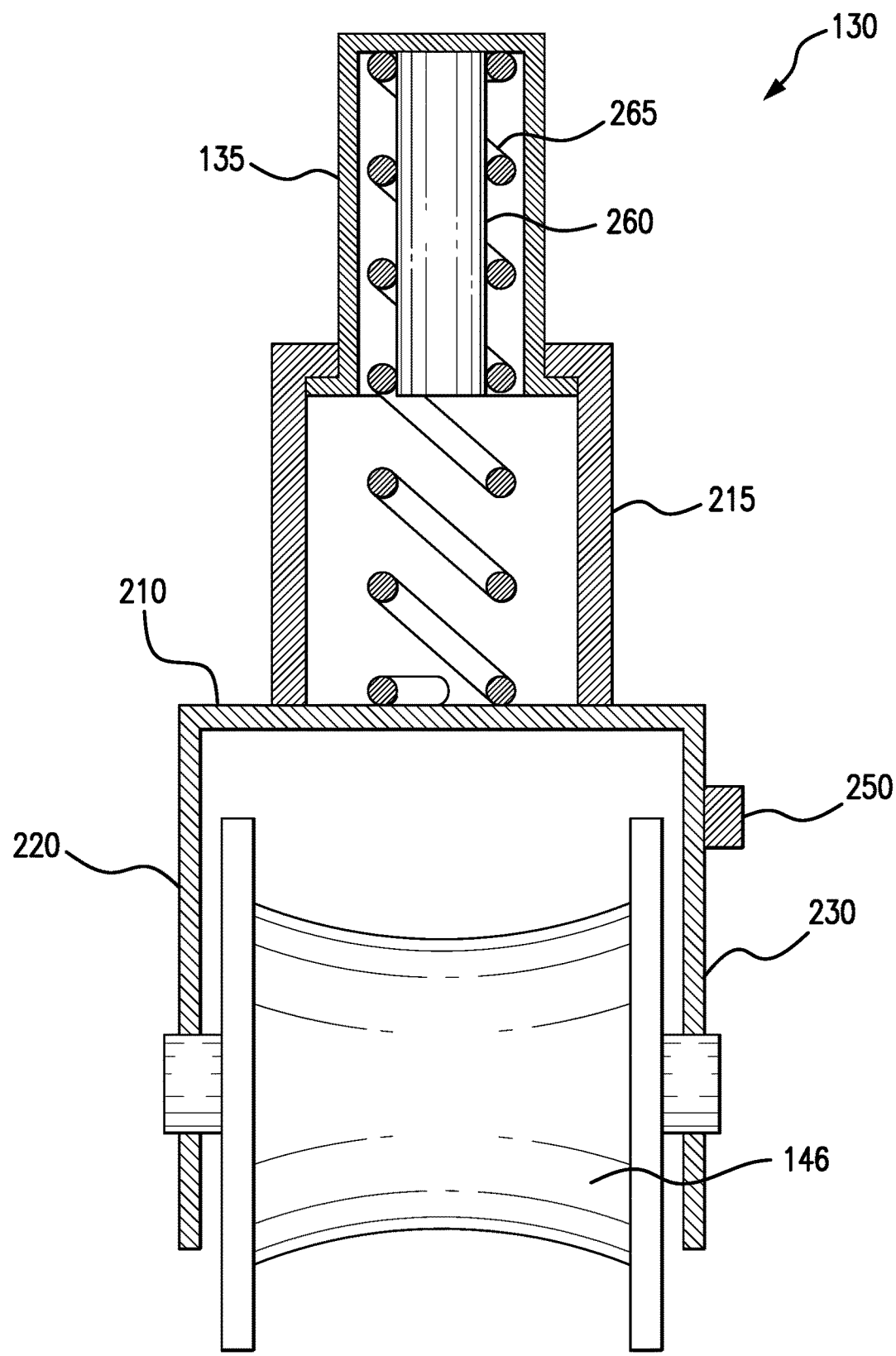
FIG. 2B illustrates the clevis of FIG. 2A in an extended position, according to certain embodiments.
Figure 2C:
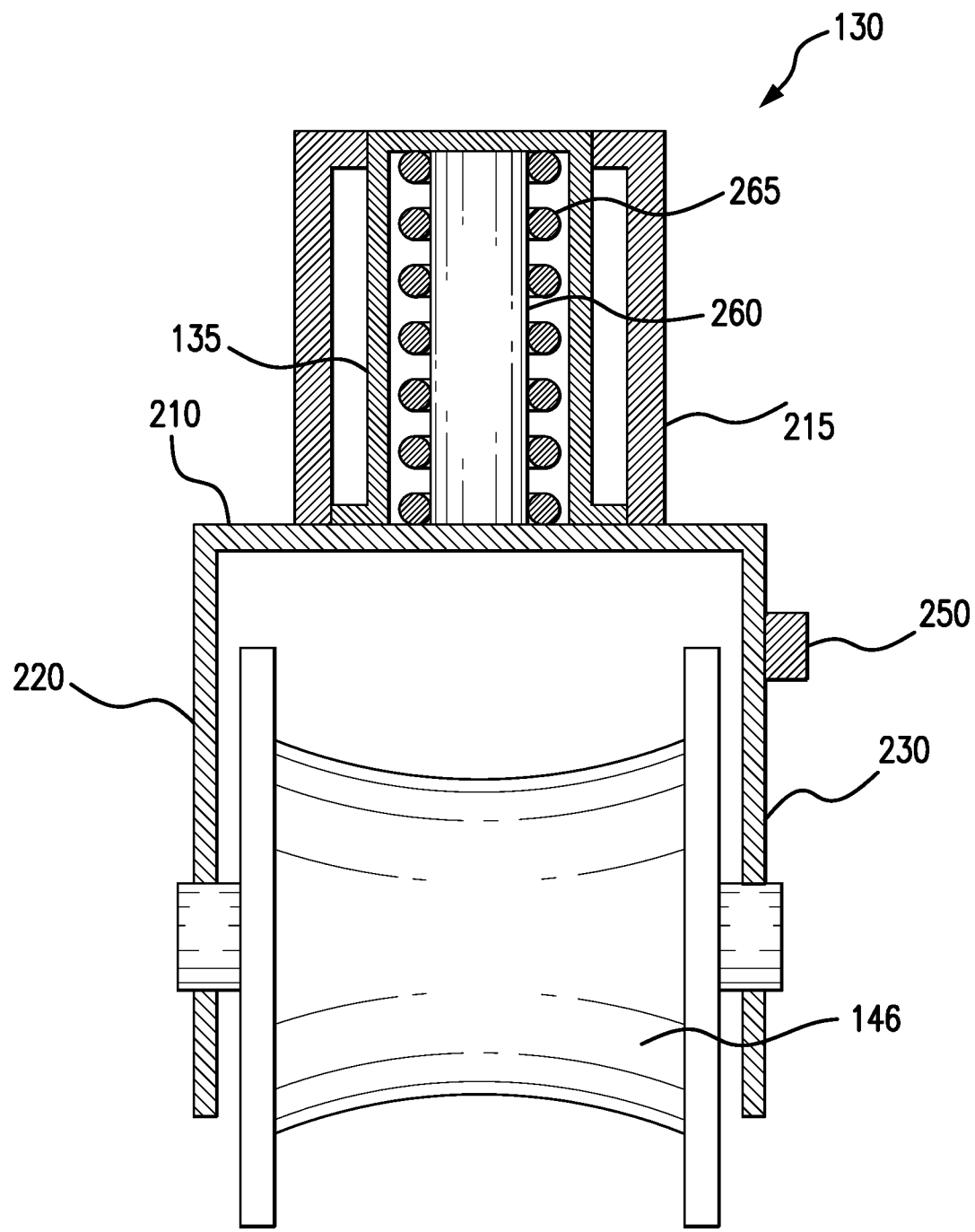
FIG. 2C illustrates the clevis of FIG. 2A in a retracted position, according to certain embodiments.
Figure 3:
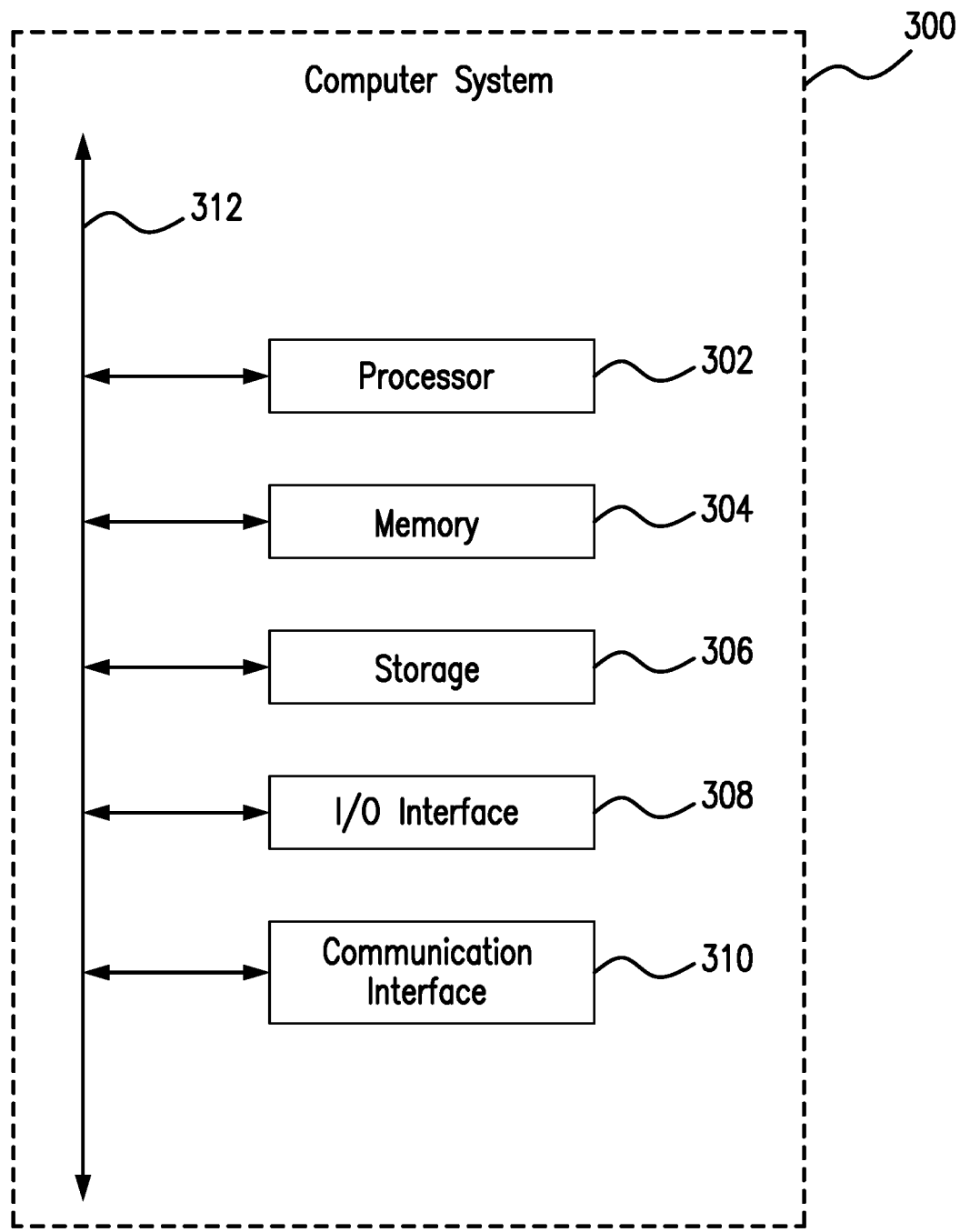
FIG. 3 illustrates a computer system of the milking system of FIG. 1, according to certain embodiments.

Embodiments of the present disclosure are best understood by referring to FIGS. 1 through 3 of the drawings, like numerals being used for like and corresponding parts of the various drawings.

In traditional parlor or rotary parlors for milking livestock, an operator typically activates an assembly to release a milking cluster to allow the milking cluster to be attached to a livestock for milking. In certain situations, it may be desirable to streamline the release of the milking cluster to increase efficiency of the milking system. To provide these and other advantages, embodiments of the disclosure determine when an operator has lifted the milking cluster, and automatically activates the assembly to release the milking cluster for attachment to the livestock.

These and other advantages and features of certain embodiments are discussed in more detail below in reference to FIGS. 1 through 3. FIG. 1 illustrates a milking system, according to certain embodiments. FIG. 2A illustrates a perspective view of a clevis, according to certain embodiments. FIG. 2B illustrates the clevis of FIG. 2A in an extended position, according to certain embodiments. FIG. 2C illustrates the clevis of FIG. 2A in a retracted position, according to certain embodiments. FIG. 3 illustrates a computer system of the milking system of FIG. 1, according to certain embodiments.

FIG. 1 illustrates a milking system 100 that includes a milking cluster 110, a cabinet 115, a controller 120, an assembly 125, a clevis 130, a cylinder 135, a cord 140, and a pulley system 145. Milking system 100 is used to milk a cow, a goat, a sheep, or any other livestock 105 suitable for milking. When milking cluster 110 is ready to be attached to livestock 105, an operator lifts milking cluster 110. Lifting milking cluster 100 causes cord 140 to thread through pulley system 145 and displace clevis 130. When clevis 130 is displaced to within a predefined distance of sensor 155, sensor 155 sends a displacement signal to controller 120. Upon receiving the displacement signal, controller 120 may activate assembly 125 such that milking cluster 110 may be attached to livestock 105.

Milking cluster 110 may be attached to one or more teats of livestock 105 in order to collect milk from livestock 105. Milking cluster 110 may include a claw, four shell assemblies, four milking tubes, four air tubes, and an air fork used to maintain the appropriate spacing between the other components of milking cluster 110. Milking cluster 110 may also include a pulsator device used to alternatively apply atmospheric air pressure or vacuum pressure to teat cup liners which are attached to the teats of livestock 105 in order to draw milk out of livestock 105. In certain embodiments, milking cluster 110 may be coupled to assembly 125. Milking cluster 110 may be coupled to assembly 125 through, for example, a rope or a chain. Although FIG. 1 illustrates one milking cluster 110, milking system 100 may include any number of milking clusters 110 to accommodate any particular size of milking parlor.

In some embodiments, assembly 125 includes clevis 130, a piston 260, pulley system 145, and a sensor 155, further discussed below. Assembly 125 may be activated by controller 120 upon controller 120 receiving a displacement signal from sensor 155. When assembly 125 is activated by controller 120, assembly 125 releases milking cluster 110 to allow it to be attached to livestock 105 for milking. For example, in certain embodiments, milking cluster 110 may be coupled to a cylinder 135 of clevis 130 through a rope or chain. In certain embodiments, milking cluster 110 may be coupled to cylinder 135 via cord 140. When assembly 125 is activated by controller 120, cylinder 135 releases cord 140 such that cord 140 may be extended. Extending cord 140 may allow milking cluster 110 to be pulled over to livestock 105 for milking. In certain embodiments, assembly 125 may release milking cluster 110 by causing clevis 130 to move from a retracted position to an extended position, or from an extended position to a retracted position. A retracted position of clevis 130 is illustrated in FIG. 2C and an extended position of clevis 130 is illustrated in FIG. 2B.

In some embodiments, clevis 130 includes cylinder 135. Cylinder 135 enables clevis 130 to move from a retracted position to an extended position, or from an extended position to a retracted position. In certain embodiments, cylinder 135 may receive a release signal from controller 120. In certain embodiments, upon receiving the release signal, cylinder 135 may cause clevis 130 to move from a retracted position to an extended position to release milking cluster 110 to allow it to be attached to a livestock 105 for milking. In other embodiments, upon receiving the release signal, cylinder 135 may cause clevis 130 to move from an extended position to a retracted position to release milking cluster 110 to allow it to be attached to a livestock 105 for milking. In certain embodiments, cylinder 135 may include piston 260. In certain embodiments, cylinder 135 may cause piston 260 to move toward clevis 130, thereby causing clevis 130 to move from an extended position to a retracted position. In certain embodiments, cylinder 135 may cause piston 260 to move away from clevis 130, thereby causing clevis 130 to move from a retracted position to an extended position. In some embodiments, cylinder 135 may include a threaded shaft.

Pulley system 145 allows clevis 130 to move within assembly 125. Pulley system 145 may include one or more pulleys 146 and cord 140. In some embodiments, pulleys 146 may be coupled to clevis 130 as further discussed below. Cord 140 may be coupled to milking cluster 110. When an operator lifts milking cluster 110, cord 140 threads through pulley system 145 and allows clevis 130 to be displaced within assembly 125. In certain embodiments, when controller 120 activates assembly 125, pulley system 145 allows milking cluster 110 to be released so that it may be attached to livestock 105. Cord 140 may be made of any material suitable for pulley system 145, including rope, nylon, rubber, line, string, fiber, and the like.

In certain embodiments, milking system 100 includes a cabinet 115. Cabinet 115 may include any structure that may be coupled to assembly 125. In some embodiments, assembly 125 is at least partially within cabinet 115. In certain embodiments, assembly 125 may be permanently affixed within cabinet 115. In yet other embodiments, assembly 125 may be detachably coupled to cabinet 115. Other components of milking system 100, such as controller 120, may also be coupled to cabinet 115 in certain embodiments.

In some embodiments, controller 120 includes a processor and a memory used to control the milking process of system 100. Particular embodiments of controller 120 may include computer system 300, further discussed below. When clevis 130 is displaced within a predefined distance of sensor 155, sensor 155 sends a displacement signal to controller 120. The displacement signal received by controller 120 causes controller 120 to activate assembly 125 to release milking cluster 110 so that it may be attached to livestock 105 for milking. In certain embodiments, controller 120 may also be configured to generate a release signal in response to receiving displacement signal from sensor 155. Cylinder 135 may be configured to receive a release signal from controller 120. Upon receiving a release signal from controller 120, cylinder 135 may activate assembly 125 to release milking cluster 110.

In some embodiments, assembly 125 may include sensor 155. In general, sensor 155 detects its proximity to clevis 135. When clevis 130 moves from a retracted position to an extended position, clevis 130 is displaced with respect to sensor 155. When clevis 130 is within a predefined distance of sensor 155, sensor 155 sends a displacement signal to controller 120. Sending a displacement signal to controller 120 activates assembly 125 for attaching milking cluster 110 onto livestock 105 for milking. Sensor 155 may send a displacement signal to controller 120 when clevis 130 is within any range or predefined distances of sensor 155. For example, sensor 155 may send a displacement signal to controller 120 when clevis 130 is within half of an inch of sensor 155. In some embodiments, the predefined distance may depend on the size, thickness, and/or length of sensor 155 and/or first magnet 250. For example, a larger sensor 155 or first magnet 250 may result in a larger predetermined distance that is required to trigger the displacement signal being sent to controller 120. In certain embodiments, sensor 155 may include a magnetic sensing mechanism, further described below.

FIGS. 2A to 2C illustrate various perspective views of clevis 130 according to certain embodiments. When milking cluster 110 is ready to be attached to a livestock 105, an operator lifts milking cluster 110. Lifting the milking cluster 100 causes cord 140 to thread through pulley system 145, and displace clevis 130 within assembly 125. When clevis 130 is displaced within assembly 125 to within a predefined distance of sensor 155, sensor 155 sends a displacement signal to controller 120. The displacement signal received by controller 120 causes controller 120 to activate assembly 125 such that the operator may attach milking cluster 110 to livestock 105. In certain embodiments, controller 120 may also be configured to generate a release signal in response to receiving the displacement signal from sensor 155. Cylinder 135 may be configured to receive the release signal from controller 120, and in response, may activate assembly 125 to release milking cluster 110.

FIG. 2A illustrates a perspective view of clevis 130 according to certain embodiments. Clevis 130 may be made of any appropriate material, including stainless steel. In some embodiments, clevis 130 includes a base member 210, a first member 220, a second member 230, and cylinder 135. In certain embodiments, base member 210 may be coupled to first member 220, second member 230, and cylinder 135. Base member 210 may be coupled to first member 220, second member 230, and cylinder 135 via screws, fasteners, welding, clips, bolts, or any other means of attachment. First member 220 may include a first aperture 225 for coupling pulley system 145 to clevis 130. Similarly, second member 230 may include a second aperture 235 for coupling pulley system 145 to clevis 130. In certain embodiments, first aperture 225 and second aperture 235 may couple pulley system 145 to clevis 130. In some embodiments, pulley 146 may be coupled to first aperture 225 and second aperture 235 of clevis 130. First aperture 225 and second aperture 235 may be a circle, an oval, a square, a rectangle, a triangle, or any shape suitable for coupling pulley system 145 to clevis 130.

In certain embodiments, clevis 130 may also include a sleeve 215. Sleeve 215 may be coupled to base member 210. In certain embodiments, cylinder 135 may be positioned at least partially within sleeve 215. Sleeve 215 may be made of any appropriate material, including stainless steel. In certain embodiments, sleeve 215 may protect cylinder 135 and piston 260 from wear and tear.

Embodiments of the disclosure provide certain advantages to an automatic release of milking cluster 110 to allow it to be attached to a livestock 105 for milking. For example, in previous milking systems, assembly 125 might cause clevis 130 to rotate or twist as it moved from a retracted position to an extended position, or from an extended position to a retracted position. In certain embodiments, it might be desirable to minimize rotation or twisting of clevis 130 within assembly 125 as it moved from the retracted position to the extended position, or from the extended position to the retracted position. For example, rotating or twisting of clevis 130 may prevent its ability to move within assembly 120 or to change from the retracted position to the extended position, or from the extended position to the retracted position. In certain embodiments, it may also be desirable for clevis 130 to change from retracted position to extended position, or from extended position to retracted position with a longer stroke. For example, a longer stroke of clevis 130 may prevent cylinder 135 or piston 260 from rebounding from the sides of assembly 125 as clevis 130 changes from the retracted position to the extended position, or from the extended position to the retracted position. Embodiments of clevis 130 depicted in FIG. 2A may provide these and other advantages to milking system 100.

FIGS. 2B and 2C illustrate clevis 130 in its extended and retracted positions, respectively. Clevis 130 moves from a retracted position to an extended position when an operator lifts milking cluster 110. Lifting milking cluster 110 causes cord 140 to thread through pulley system 145 and pull clevis 130 from a retracted position to an extended position.

In some embodiments, clevis 130 may include a first magnet 250 to provide a magnetic sensing mechanism. For example, in certain embodiments clevis 130 may include a first magnet 250 that may be coupled to the first member 220, second member 230, or base member 210, and sensor 155 may include a second magnet. In such embodiments, sensor 155 detects when first magnet 250 comes within a predefined proximity of the second magnet. Although FIG. 2B illustrates first magnet 250 coupled to second member 230, first magnet 250 may alternatively be coupled to first member 220 or base member 210. In general, first magnet 250 may be positioned anywhere on clevis 130 suitable for sensor 155 to detect its proximity.

In some embodiments, piston 260 is at least partially within cylinder 135 and is configured to move within cylinder 135 to cause clevis 130 to change from a retracted position to an extended position or from an extended position to a retracted position. For example cylinder 135 may cause piston 260 to move away from base member 210 of clevis 130, thereby causing clevis 130 to change from a retracted position to an extended position. In other embodiments, cylinder 135 may cause piston 260 to move toward base member 210 of clevis 130, thereby causing clevis 130 to change from an extended position to a retracted position. In certain embodiments, cylinder 135 may be configured to apply air pressure to piston 260 to cause piston 260 to move within cylinder 135. In other embodiments, cylinder 125 may be configured to apply vacuum suction to piston 260 to cause piston 260 to move within cylinder 135.

In some embodiments, piston 260 may include a spring-loaded mechanism. The spring-loaded mechanism in such embodiments may include spring 265 that is at least partially within piston 260. In certain embodiments, spring 265 may aid cylinder 135 in causing piston 260 to move within cylinder 135. In certain embodiments, spring 265 may enable piston 260 to return to a default state after air pressure or vacuum suction applied by cylinder 135 to piston 260 has ceased.

FIG. 3 illustrates an example computer system 300. Computer system 300 may include controller 120. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate. In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Although several embodiments have been illustrated and described in detail, it will be recognized that substitutions and alterations are possible without departing from the spirit and scope of the present disclosure, as defined by the appended claims. While several embodiments have been provided in the present disclosure, it should be understood that the disclosed systems might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a milking cluster configured to attach to one or more teats of a livestock;
an assembly comprising:
a pulley system comprising a cord, wherein the cord comprises a first end coupled to the milking cluster; and
a clevis comprising:
a first member comprising a first aperture configured to couple the pulley system to the clevis;
a second member comprising a second aperture configured to couple the pulley system to the clevis;
a base member coupled to the first member and the second member; and
a cylinder coupled to the base member;
a piston positioned at least partially within the cylinder and configured to move within the cylinder;
a sensor configured to generate a displacement signal in response to detecting that a portion of the clevis is within a predefined distance of the sensor; and
a controller configured to receive the displacement signal from the sensor.

2. The system of claim 1, wherein:
the controller is further configured to generate a release signal in response to receiving the displacement signal from the sensor; and
the cylinder is configured to:
receive the release signal from the controller; and
cause the piston to move within the cylinder.

3. The system of claim 1, wherein:
the clevis comprises a first magnet coupled to a member of the clevis;
the sensor comprises a second magnet, wherein the sensor is further configured to generate the displacement signal in response to detecting that the first magnet is within a predefined distance from the second magnet.

4. The system of claim 1, wherein the cylinder is configured to apply air pressure to move the piston within the cylinder.

5. The system of claim 1, wherein the cylinder is configured to apply vacuum suction to move the piston within the cylinder.

6. The system of claim 1, further comprising a cabinet coupled to the assembly.

7. The system of claim 1, wherein the piston further comprises a spring-loaded mechanism.

8. The system of claim 1, further comprising a sleeve coupled to the base member of the clevis, wherein the cylinder is at least partially within the sleeve.

9. An assembly for a milking system comprising:
a pulley system comprising a cord, wherein the cord comprises a first end coupled to a milking cluster; and
a clevis comprising:
a first member comprising a first aperture configured to couple the pulley system to the clevis;
a second member comprising a second aperture configured to couple the pulley system to the clevis;
a base member coupled to the first member and the second member;
a cylinder coupled to the base member;
a piston positioned at least partially within the cylinder and configured to move within the cylinder;
a sensor coupled to the clevis, wherein the sensor is configured to generate a displacement signal in response to detecting that a portion of the clevis is within a predefined distance of the sensor.

10. The assembly of claim 9, wherein:
the clevis comprises a first magnet coupled to a member of the clevis;
the sensor comprises a second magnet, wherein the sensor is further configured to generate the displacement signal in response to detecting that the first magnet is within a predefined distance from the second magnet.

11. The assembly of claim 9, wherein the cylinder is configured to apply air pressure to move the piston within the cylinder.

12. The assembly of claim 9, wherein the cylinder is configured to apply vacuum suction to move the piston within the cylinder.

13. The assembly of claim 9, wherein the piston further comprises a spring-loaded mechanism.

14. The assembly of claim 9, further comprising a sleeve coupled to the base member of the clevis, wherein the cylinder is at least partially within the sleeve.

* * * * *